United States Patent
Hansen et al.

(10) Patent No.: US 6,271,950 B1
(45) Date of Patent: Aug. 7, 2001

(54) OPTICAL DIFFERENTIAL PHASE SHIFT KEYING TRANSMISSION SYSTEM HAVING MULTIPLEXING, ROUTING AND ADD/REPLACE CAPABILITIES

(75) Inventors: Per Bang Hansen, Bradley Beach; Torben N. Nielsen, Monmouth Beach, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/136,434

(22) Filed: Aug. 18, 1998

(51) Int. Cl.[7] ...................................... H04J 14/08
(52) U.S. Cl. ................. 359/135; 359/140; 359/158; 359/183; 375/308
(58) Field of Search .................... 359/135, 140, 359/158, 183, 189; 375/308

(56) References Cited

U.S. PATENT DOCUMENTS

| | | | |
|---|---|---|---|
| 5,181,136 | * 1/1993 | Kavehrad et al. | 359/190 |
| 5,228,043 | * 7/1993 | Naito et al. | 359/183 |
| 5,355,243 | * 10/1994 | King | 359/190 |
| 5,491,575 | * 2/1996 | Neidlinger et al. | 359/137 |
| 5,907,421 | * 5/1999 | Warren et al. | 359/183 |

* cited by examiner

*Primary Examiner*—Kinfe-Michael Negash
(74) *Attorney, Agent, or Firm*—John A. Caccuro

(57) ABSTRACT

A Differential Phase Shift Keying (DPSK) optical transmission system provides time division multiplexing, channel routing and channel add/replace functions. The DPSK transmitter comprises a laser to generate an optical carrier signal; a delay encoder to provide a different delay for each of a plurality, M, of input signal channels; and a M channel phase modulator which phase modulates the optical carrier signal with each of the differently delayed M input signal channels to form a Time Division Multiplexed (TDM) phase modulated optical signal. A DPSK receiver demodulates a received TDM phase modulated optical signal. The system may also include apparatus to route, add, and replace TDM channels.

17 Claims, 6 Drawing Sheets

FIG. 2

| Time, t (201) | $\phi^u$ / $\phi^l$ / $\Delta\phi$ (202) | Y, $\Delta t = \tau$ (203) |
|---|---|---|
| ... | ... | ... |
| $N \cdot M \cdot \tau$ | $D_0^N[1]\ +\ D_1^{N-1}[M]\ \ldots\ +\ D_{m-1}^{N-1}[M-2]$ <br> $D_0^{N-1}[M]\ +\ D_1^{N-1}[1]\ \ldots\ +\ D_{m-1}^{N-1}[M-3]$ <br> $D_0^N[1]\ -\ D_0^{N-1}[M]\ =\ D_0^N - D_0^{N-1}$ | $D_0^N \oplus D_0^{N-1}$ |
| $N \cdot M \cdot \tau + \tau$ | $D_0^N[2]\ +\ D_1^N[1]\ \ldots\ +\ D_{m-1}^{N-1}[M-1]$ <br> $D_0^N[1]\ +\ D_1^{N-1}[M]\ \ldots\ +\ D_{m-1}^{N-1}[M-2]$ <br> $D_1^N[1]\ -\ D_1^{N-1}[M]\ =\ D_1^N - D_1^{N-1}$ | $D_1^N \oplus D_1^{N-1}$ |
| ... | ... | ... |
| $(N+1) \cdot M \cdot \tau - \tau$ | $D_0^N[M]\ +\ D_1^N[M-1]\ \ldots\ +\ D_{m-1}^N[1]$ <br> $D_0^N[M-1]\ +\ D_1^N[M-2]\ \ldots\ +\ D_{m-1}^{N-1}[M]$ <br> $D_{m-1}^N[1]\ =\ D_{m-1}^N - D_{m-1}^{N-1}$ | $D_{m-1}^N \oplus D_{m-1}^{N-1}$ |
| $(N+1) \cdot M \cdot \tau$ | $D_0^{N+1}[1]\ +\ D_1^N[M]\ \ldots\ +\ D_{m-1}^N[M-1]$ <br> $D_0^N[M]\ +\ D_1^N[M-1]\ \ldots\ +\ D_{m-1}^N[M-2]$ <br> $D_0^{N+1}[1]\ -\ D_0^N[M]\ =\ D_0^{N+1} - D_0^N$ | $D_0^{N+1} \oplus D_0^N$ |
| ... | ... | ... |

OPTICAL DIFFERENTIAL PHASE SHIFT KEYING TRANSMISSION SYSTEM HAVING MULTIPLEXING, ROUTING AND ADD/REPLACE CAPABILITIES

TECHNICAL FIELD OF THE INVENTION

This invention relates to optical transmission systems and, more particularly, to an optical Differential Phase Shift Keying (DPSK) transmission system having multiplexing, routing and add/replace capabilities.

BACKGROUND OF THE INVENTION

Cost is an important parameter in optical Local Area Networks (LANs) and Metropolitan Area Networks (MANs). The cost of lasers is a prime component of the costs in such networks. Also, the Carrier Sense Multiple Access with Collision Detection (CSMA/CD) protocols (e.g., Ethernet, IEEE 802.3, etc.) of traditional LANs may not readily be adopted for optical LAN/WANs because of the longer distances involved.

What is desired is an optical LAN/MAN network where multiple users can share the same laser source and at the same time provide an efficient way of allocating bandwidth among users.

SUMMARY OF THE INVENTION

The apparatus and method of the present invention solves the above problems in a Differential Phase Shift Keying (DPSK) optical transmission system which provides time division multiplexing, channel routing and channel add/replace functions. Our techniques also provide a flexible way of allocating bandwidth among multiple users. This makes DPSK attractive for LAN/MAN applications because the cost of one laser (or several lasers in case of a WDM system) can be shared among multiple users.

More particularly, our DPSK transmitter comprises a laser to generate an optical carrier signal; a delay encoder to provide a different delay for each of a plurality, M, of input signal channels; and a M channel phase modulator to phase modulate the optical carrier signal with each of the differently delayed M input signal channels to form a Time Division Multiplexed (TDM) phase modulated optical signal. A TDM phase modulated DPSK system is formed by combining the transmitter with a receiver for demodulating a received TDM phase modulated optical signal.

In another embodiment, an add node is disclosed for adding a signal channel to an empty time slot channel of a received TDM phase modulated optical signal. The add node includes a receiver to demodulate the received TDM phase modulated optical signal to form an output TDM signal including the empty time slot channel; a clock recovery circuit to provide a synchronization signal for the add signal; and a flip-flop to gate the add signal onto a phase modulator. As a result, the add signal is added into the empty time slot channel of the received TDM signal.

In yet another embodiment, a channel replace node is disclosed for replacing a selected channel of a received TDM phase modulated optical signal with a new channel signal. The channel replace node includes a receiver to demodulate the received TDM phase modulated optical signal to form an output signal; a demultiplexer and clock recovery circuit to recover data and clock signals of all TDM channels; a channel reset circuit; a flip-flop to add the new channel to the TDM signal; and a channel phase modulator to phase modulate the product signal so as to overwrite the selected channel of the received TDM signal.

BRIEF DESCRIPTION OF THE DRAWING

In the drawing,

FIG. 2 is a table showing the demodulated output signal, Y, during one bit period of the low speed input channel;

DETAILED DESCRIPTION

In the following description, each item or block of each figure has a reference designation associated therewith, the first number of which refers to the figure in which that item is first described (e.g., 101 is first described in FIG. 1).

Figure 1:
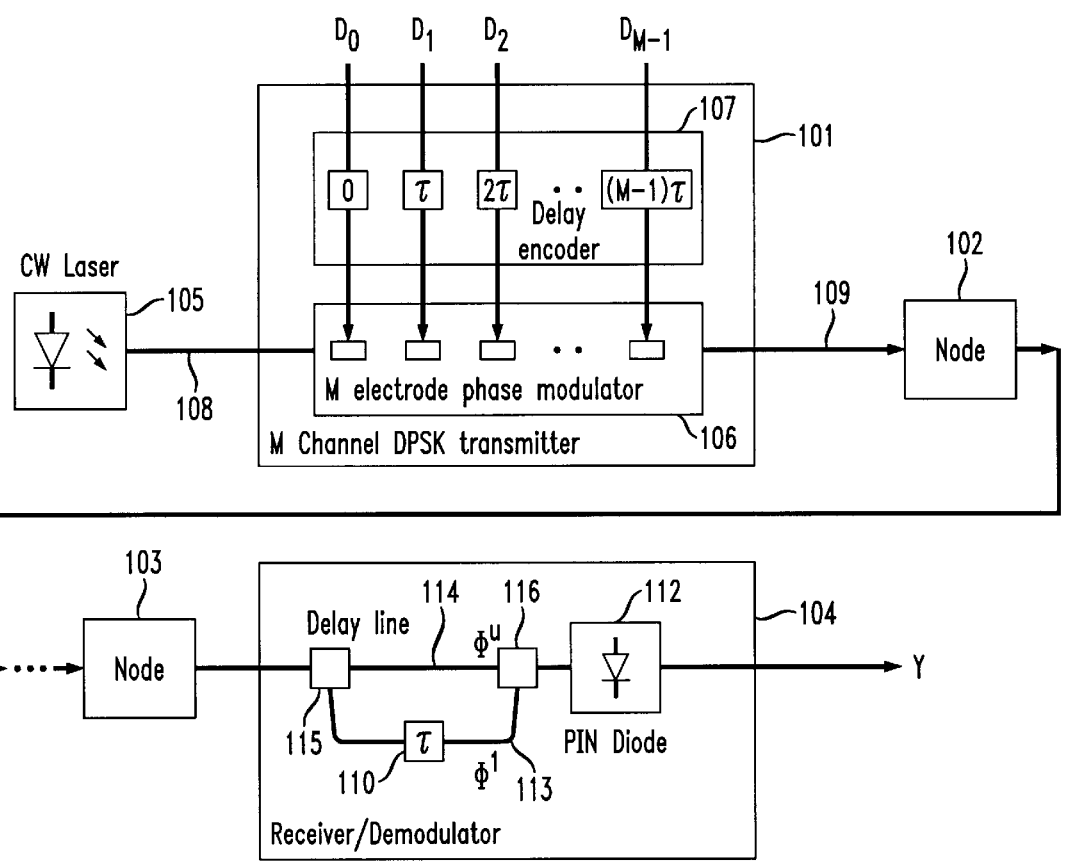
FIG. 1 shows an illustrative block diagram of an optical Differential Phase Shift Keying (DPSK) transmission system in accordance with the present invention.

With reference to FIG. 1, there is shown an illustrative block diagram of an optical Differential Phase Shift Keying (DPSK) transmission system including a transmitter 101, one or more nodes 102–103, and a receiver 104. In accordance with the present invention we describe a simple technique to incorporate time division multiplexing, channel routing and channel add/replace functions in the DPSK optical transmission system of FIG. 1. Our techniques also provide a flexible way of allocating bandwidth among multiple users (i.e. data channels $D_0$–$D_{M-1}$). This makes DPSK attractive for certain LAN/MAN applications because the cost of laser 105 (or several lasers in case of a WDM system) can be shared among multiple users.

Our novel technique allows multiple users to phase modulate the same optical carrier (i.e., laser 105) signal. Normally this would produce a phase modulated optical signal that—when demodulated—becomes the exclusive-OR of all channels. However, by offsetting the phase of the individual input channels, the demodulated signal becomes a time division multiplexed (TDM) version of the individual input channels, with no interrelation between the channels.

(1) Mx1 Multiplexing DPSK Transmitter

As shown in FIG. 1, unlike the standard DPSK transmitter, the multiplexing (D)PSK transmitter 101 incorporates a M electrode phase modulator 106 and a delay encoder 107 for providing time division multiplexing of M NRZ data channels, $D_0$–$D_{M-1}$.

The inputs to the transmitter 101 are M low speed NRZ data channels, $D_0$ to $D_{M-1}$. The amplitude of each input channel is adjusted so that the voltage for a logic "1" equals $V\pi$ and 0 V for a logic "0", where $V\pi$ is the voltage required to induce a $\pi$ phase shift of the optical field of carrier signal 108. Each of the low speed channels are fed to a well known pre-encoder (i.e., delay encoder 107) where each of the data channels are delayed (electrically) by different amounts. The amount of delay induced on the input channels increase in steps of $\tau$, where $\tau$ equals the bit duration of the low speed channel, $\tau_0$, divided by M. Thus, each of the different delays provided by the delay encoder is equal to $m\tau$, where $\tau=\tau_0/M$ and m is an integer $0 \leq m \leq M-1$. The bit time $\tau$ then becomes the bit duration of the multiplexed data stream, Y. The resulting output signal of transmitter 101 is an optical carrier signal that has been modulated by each of the M NRZ data channels.

It should be noted, more generally, that the time interval $\tau_0$ can be divided by an integer number X which is greater than the number of input data channels M. In such an arrangement, $\tau=\tau_0/X$, where X is an integer greater than or equal to M. The resulting extra time slots formed can be used for signaling, control or made available for other data channels.

For the moment, we assume that the nodes 102 through 103 of FIG. 1 merely pass the modulated signal unaltered. The receiver 104 is a standard DSPK receiver/demodulator which includes a delay line 110, followed by a square law detector 112. The square-law detector 112 is illustratively shown as a PIN diode. A splitter 115 splits the incoming signal into two portions. One signal portion $\phi''$ is coupled via combiner 116 to detector 112 while the second signal portion is delayed in delay-line 110 (becoming signal $\phi'$) before being coupled, via combiner 116, to detector 112. The delay in the delay-line 110 of the receiver/demodulator 104 must also be $\tau$, where $\tau$ is the bit time of the multiplexed data signal. At detector 112 each bit of the TDM signal $\phi'$, 113, is combined with a subsequent bit of that TDM signal $\phi''$, 114. Note, since the time delay is $\tau$, adjacent bits of the TDM signal are Exclusive-ORed in detector 112. The resulting detector 112 output signal is of the form $D_m^{N+1} \oplus D_m^N$, which is a output bit for only one channel m. Thus, if the phase of the bit of TDM signal $\phi'$, 113, has the same phase as the subsequent bit of that TDM signal $\phi''$, 114, the resulting phase difference of the combined signal is zero. That is if the adjacent bits of signals $\phi'$, 113, and $\phi''$, 114 are both logic "0" or logic "1" then the output of detector 112 is logic "0". If however, the bits of signals $\phi'$, 113, and $\phi''$, 114 are not the same, e.g., one bit is a logic "0" and the other bit a logic "1", then the output of detector 112 is logic "1". The result is that the detector 112 performs an exclusive-OR function on the signals $\phi'$, 113, and $\phi''$, 114. The output signal, Y, of detector 112 is a high speed (M times the speed of the D-channels) NRZ data channel which contain the multiplexed $D_0$ to $D_{M-1}$ data channels.

While the receiver/demodulator 104 has been shown using separate fibers for the paths, it should be understood that the relative delay in the two paths can be obtained by other means, such as, using two orthogonally polarized signals in the same fiber or by using the delay between the guiding and cladding modes of a single fiber.

The output signal, Y, is a time division multiplexed version of the M input channels $D_0$ to $D_{M-1}$ except that the bits of each channel have been exclusive-ORed with the preceding bit of that channel. This is a general feature of any DPSK system and is caused by the differential detection in the demodulator/receiver 104. (Note, it is easy to obtain the original data by placing a pre-encoder in the transmitter before the signal is applied to the phase modulator 106, or by decoding the signal in the receiver) The important thing to notice is that correlation exists only between adjacent bits of the same input channel, i.e. there is no correlation between bits from different channels and each input channel can therefore be extracted from the output signal by simple electrical de-multiplexing. The underlying mechanism is that the change in the phase of the transmitted optical signal during a time interval of $\tau$ is attributed to one—and only one—of the input channels changing value. The incremental delay step, $\tau$, in the encoder 107 must be equal to the delay, $\tau$, used in the demodulator/receiver 104 and is equal to $\tau_0/M$ where $\tau_0$ is the bit period of the input channels.

The resulting output signal, Y can be interpreted as framed (with a frame time of $\tau_0=M\cdot\tau$) with each frame containing 1 bit from each input channel, i.e. each input channel is allocated one time-slot per TDM frame. It should be noted that the multiplexing scheme applies for odd as well as even numbers of M.

Figure 3:
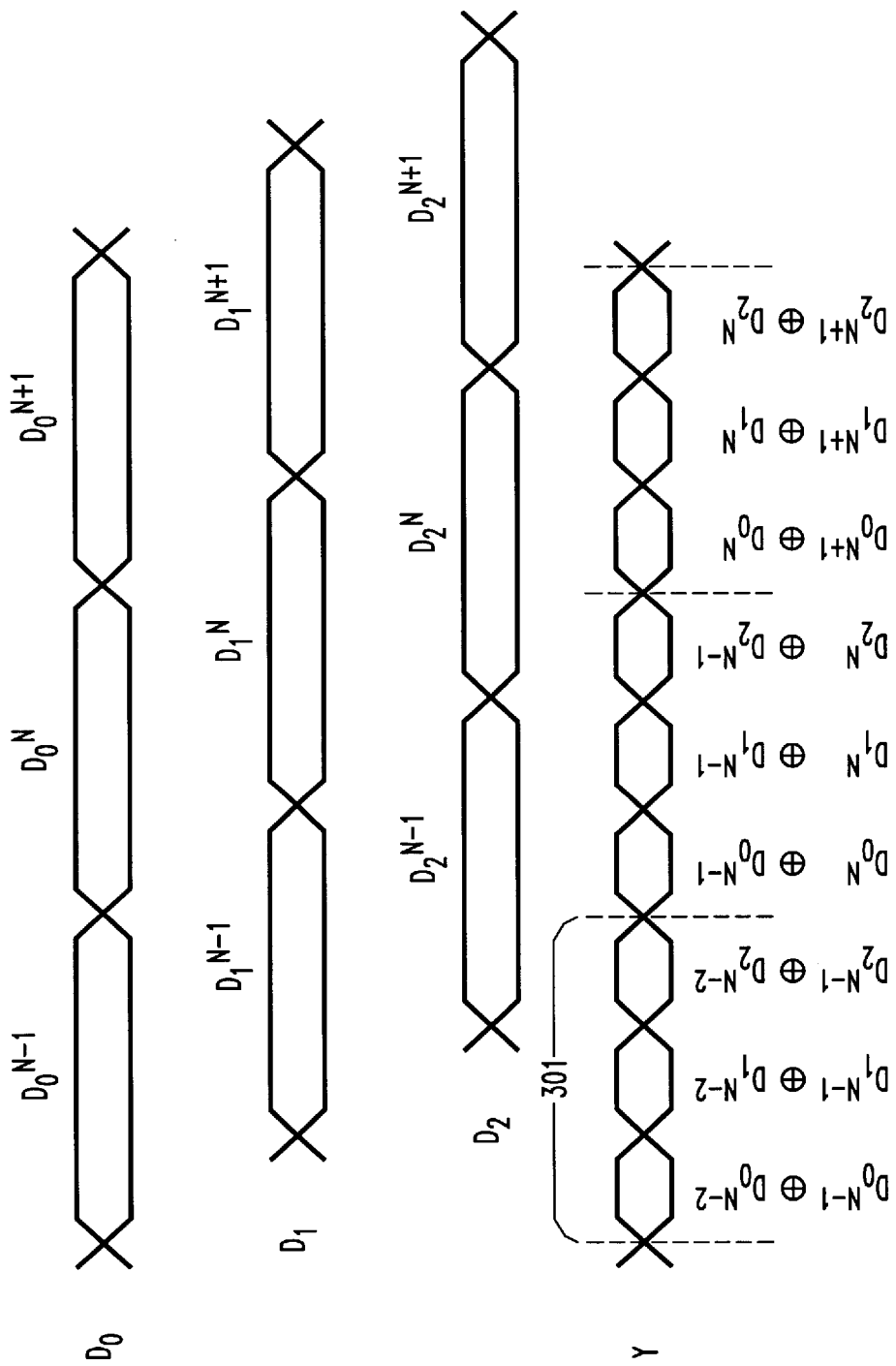
FIG. 3 shows three frames of the demodulated output signal resulting from the multiplexing of 3 input channels, with the dashed vertical lines indicating the framing of the output signal, Y.

The FIG. 2 table and FIG. 3 illustrates in detail how the multiplexing of the N'th bit of the M input channels $D_0$ to $D_{M-1}$ is performed. FIG. 2 is a table showing the time slots $\tau$, 201, the signals $\phi'$, $\phi''$, and $\Delta\phi$ 202, and the demodulated output signal Y, 203 during each bit period $\tau$ of frame N (Note, a frame time is one bit period $\tau_0$ of the low speed input data channels $D_0$ to $D_{M-1}$). FIG. 3 shows three frames of the demodulated output signal resulting from the multiplexing of, illustratively, 3 input channels, with the spacing between the dashed vertical lines, 301, indicating the framing of the output signal Y.

In FIGS. 2 and 3, values in bold are logical values, where $D_x^y$ is the optical phase induced by the y'th bit in the x'th input channel and $D_x^y$ is the corresponding logical value. Numbers in brackets (as in $D_x^y[z]$), describes the value of $D_x^y$ during the Z'th interval of $D_x^y$ (of which there are M). The center column, 202, of the FIG. 2 table gives the phase ($\phi''$) of the optical field in the upper arm, 114 of FIG. 1, in the receiver/demodulator and the phase ($\phi'$) in the lower arm, 113 of FIG. 1, after delay $\tau$. Finally, $\Delta\phi$ gives the difference between $\phi''$ and $\phi'$. In reducing the expressions for $\Delta\phi$, the equivalence $D_x^y[p]=D_x^y[q]$ is used.

(2) Mx1 Multiplexing DPSK Transmitter With Routing Functionality

Figure 4:
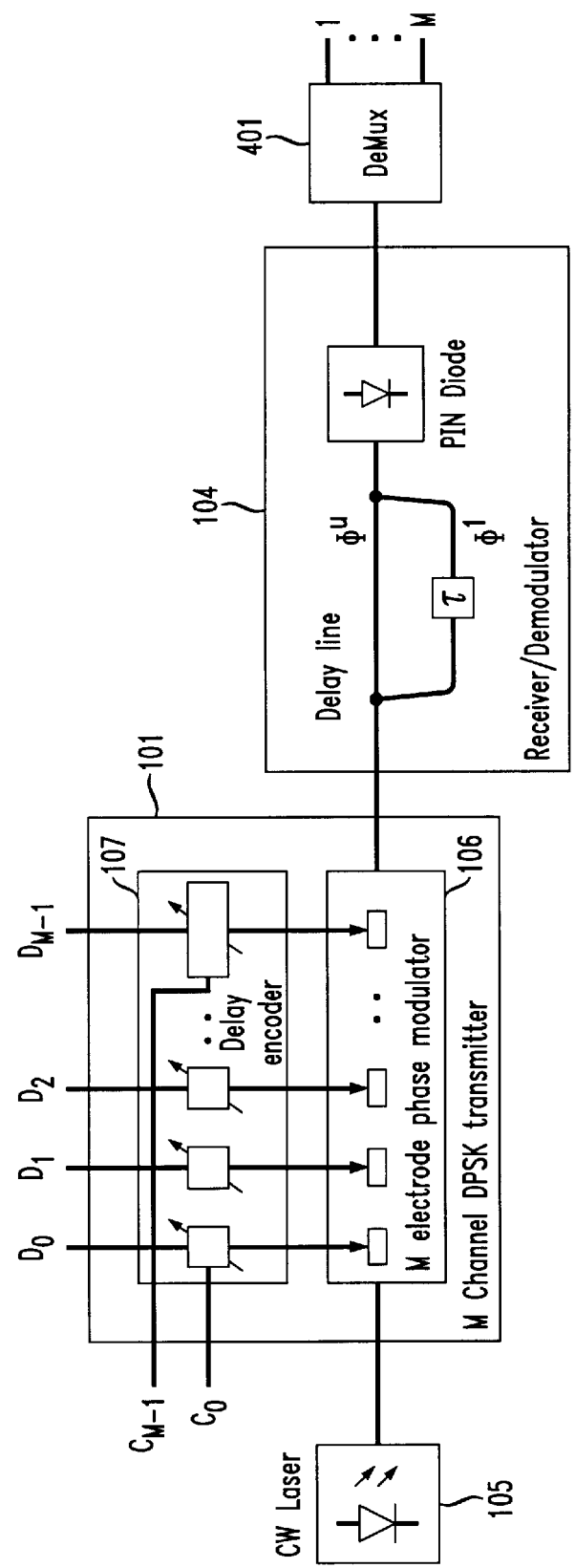
FIG. 4 shows an illustrative block diagram of a router in accordance with the present invention.
Figure 5:
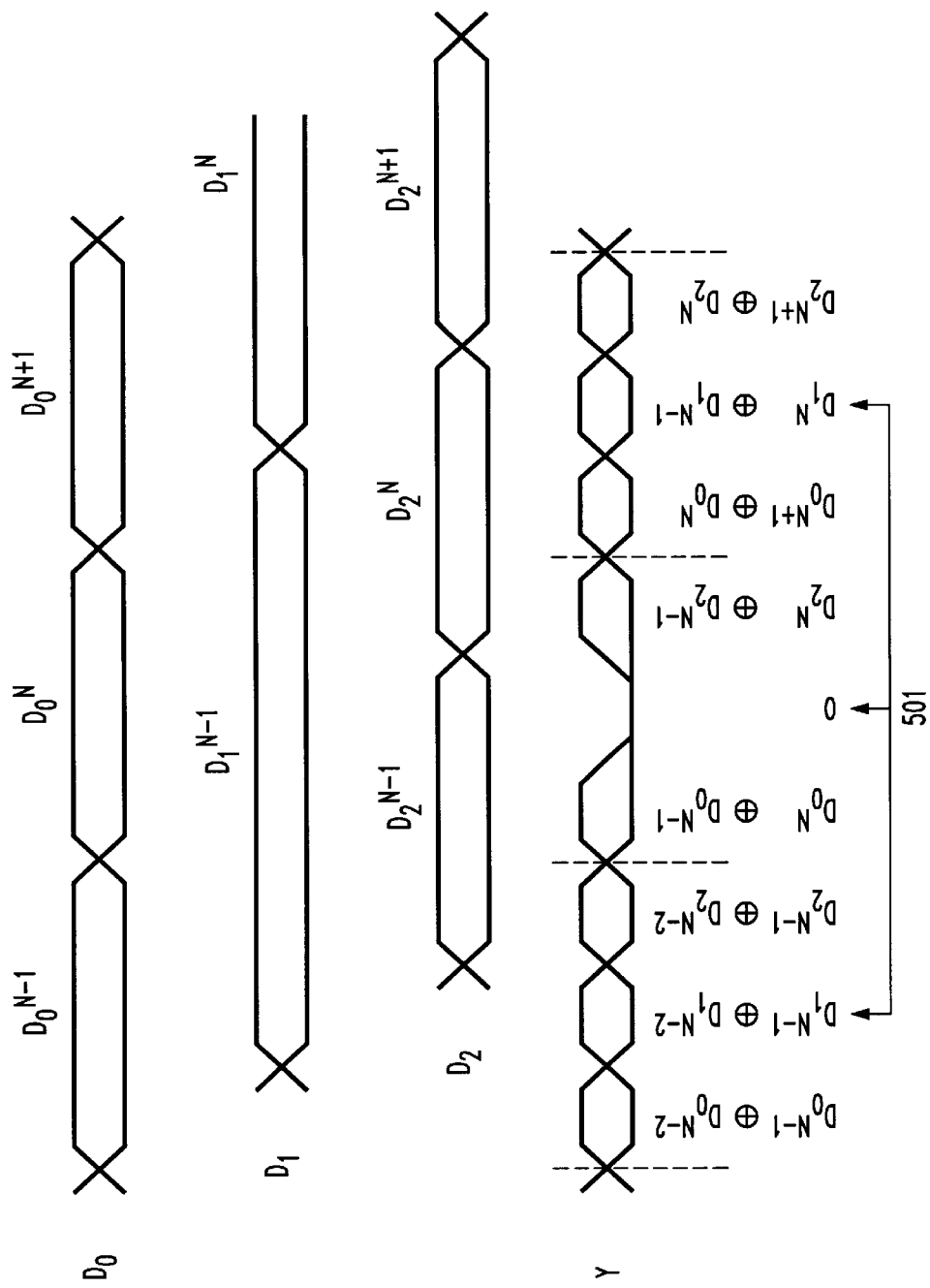
FIG. 5 shows an output signal of demodulator/receiver when the input channels have different data rates.

With reference to FIG. 1 again, the order in which the input channels, $D_0$ to $D_{M-1}$, appear in the frames of the output signal, Y, depends on the electrical delays dialed into the delay encoder 107 of the transmitter 101. To switch the order of e.g. D1 and D2, one only need swap the two delays in the transmitter. A re-configurable/tunable delay encoder 107 combined with a receiver/demodulator 104 incorporating a de-multiplexer with M output lines can therefore serve as a router of the M input channels, $D_0$ to $D_{M-1}$. This router arrangement is shown in FIG. 4. As shown, control signals $C_0$ through $C_{M-1}$ are used to set the electrical delays of delay encoder 107. These control signals, $C_0$ through $C_{M-1}$, thereby control to which of the M outputs of demultiplexer 401 each of the input channels, $D_0$ to $D_{M-1}$, can be switched.

(3) Mx1 Multiplexing DPSK Transmitter Where Input Channels Can Have Different Bit-rates The multiplexing DPSK transmitter 101 also handles input channels with different bit-rates. The only requirement is that the bit period of any input channel, $\tau_d$, be a non-zero integer (p) multiple of $\tau_0$, where $\tau_0=M\cdot\tau$, i.e. the bit period of any input channel must satisfy $\tau_d=p\cdot M\cdot\tau$. More generally, as previously noted, $\tau_d=p\cdot X\cdot\tau$, where $\tau$ is equal to $\tau_0/X$ and where X is an integer greater than or equal to M.

Consider an arbitrary input channel $D_x$: If the bit period of $D_x$ equals $\tau_0=M\cdot\tau$ (corresponding to p=1) the resulting demodulated output signal, Y, will contain data in each and every frame in the time slot allocated to $D_x$. If p>1 (corresponding to a reduced bit rate of $D_x$) the data of $D_x$ will only be transferred to $D_x$'s time slot in every p'th frame of the demodulated Y signal while the rest of the frames contains a logic "0". This is illustrated in FIG. 4 for the case of 3 input channels $D_0$–$D_2$, with the bit rate of $D_1$ being half that of $D_0$ and $D_2$, i.e. $D_1$ has p=2. The resulting demodulated output signal contains a 0 in every second frame in the time slot allocated to $D_1$, see 501, while the remaining frames contains the $D_x$ data. Note that the demodulated output signal for input channel $D_1$ is "return-to-zero (RZ) like" since it returns to zero after each bit. Any combination of bit rates and number of input channels is possible as long as $\tau_d = p \cdot M \cdot \tau$ is satisfied with p being an integer number.

(4) DPSK System With Add Functionality

Figure 6:
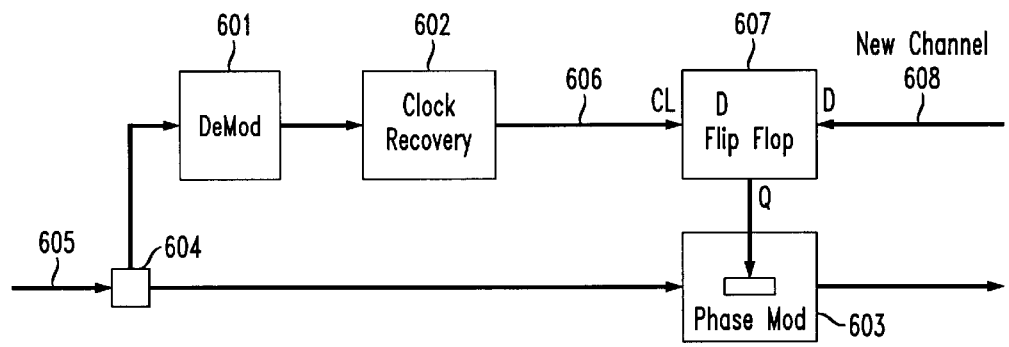
FIG. 6 shows an add node, for use in the system of FIG. 1, having an add channel capability.

If the transmitter 101 is less than fully loaded, i.e., it has less than M input channels and/or the bit rate of one or more channels is reduced, empty time slots will be available for users at node 102, 103 further down the transmission line 109. As illustrated in FIG. 6, a new Non-Return-to-Zero (NRZ) data channel 608 can be added using a single electrode phase modulator 603 inserted in the transmission line 605. The added channel must satisfy the condition $\tau_d = p \cdot M \cdot \tau$. Synchronization (which will be required to clock the new data into the phase modulator 603) can be implemented very easily by tapping, using coupler 604, some of the input signal, 605, to a demodulator/receiver 601. The output of this demodulator/receiver 601 will have a distinct frequency component ($f = 1/\tau_0$) at the frequency at which empty time slots occur (because the logic value in a free time slot always is "0"). The output of demodulator/receiver 601 is connected to a frame clock recovery circuit 602 which locks onto the first logic "0" signal of each frame (occurring every To seconds) to generate a bit wide clock signal that repeats at the frame rate frequency $f = 1/\tau_0$. The frame clock signal 606 is used as the clock input (CL) of a "D" type flip-flop 607, while the new (or add) channel 608 is connected to the data input D of flip-flop 607. The flip-flop 607 is used to clock or gate the new (add) channel 608 into the phase modulator 603 in frame and bit synchronization with the empty data channel of the TDM signal that it is to placed. This synchronization method applies independent on whether the free capacity is a result of a reduced number of channels or a reduced bit-rate of one or more channels. This is because any free capacity will show up as demodulated "0's"

(5) DPSK System With Overwrite Functionality

A channel of the M channel multiplexed input signal, which already contains data, can be overwritten with new data (i.e. a new channel can replace an existing channel). The process includes extracting data and clock of the channel to be replaced. The time slot in the optical signal that corresponds to this channel is then reset. The new (or add) channel is then added in the manner described in FIG. 6. Note that channel clock does not have to be extracted again.

Figure 7:
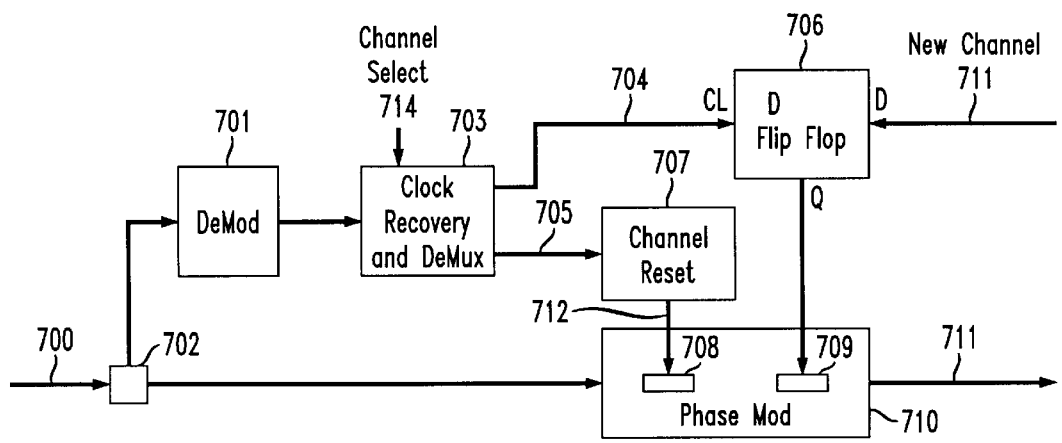
FIG. 7 shows a replace node having a overwrite/replace channel capability.
Figure 8:
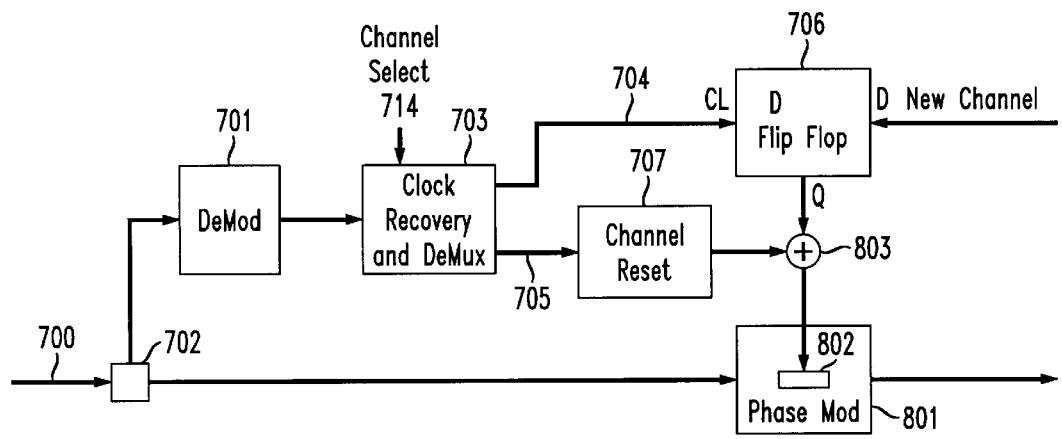
FIG. 8 shows another embodiment of a replace node having a overwrite/replace channel capability.

Circuits for providing a network node with a overwrite/replace channel capability are illustrated in FIGS. 7 and 8. With reference to FIG. 7, the overwrite/replace node includes a demodulator/receiver 701, a coupler 702, a clock recovery and demultiplexer 703, a D-type flip flop 706, a channel reset circuit 707, and a phase modulator 710. The first step is to demodulate the received TDM signal 700 in demodulator 701. The clock recovery and demultiplexer 703 is responsive to an external channel select signal 714 and generates a frame clock signal 704 bit synchronized to the timing of the bit to be replaced. The clock recovery and demultiplexer 703 also recovers the data of the channel to be replaced. The channel select signal 714 is provided by a node management control unit (not shown) to indicate which channel is to be replaced. This channel select signal is determined by the node management control unit from signaling or other control information associated with the received TDM signal or from other sources.

The recovered data signal 705 is used to drive the channel reset unit 707 (e.g., a toggle flip-flop) which causes the first modulator 708 of inline phase modulator 710 to generate the phase needed to cancel the phase of the channel data to be replaced. Thus, for example, assume the phase of a group of channels of received TDM data was $\pi, \pi, -\pi, \pi, -\pi, -\pi$, the differential phase demodulator 701 would produce the corresponding data sequence 0,1,1,1,0. If we assume that the second channel, first logic "1" of the data sequence, was to be replaced then the $-\tau$ phase associated with that second channel must be changed to $\tau$. The channel reset 707 would produce the channel select signal 712 to cause the first modulator 708 of inline phase modulator 710 to generate the phase $\tau$. Similarly, if the third channel, the second logic "1", was to be replaced 0, then the $\tau$ phase associated with that second channel must be changed to $-\tau$. The channel reset 707 would produce the channel select signal 712 to cause the first modulator 708 of inline phase modulator 710 to generate the phase $-\tau$.

The frame clock signal 704, which is bit synchronized to the timing of the bit to be replaced, is used to clock the D-type flip-flop 706 to accept the new data channel 711. The output of flip-flop 706, which has the same bit, or channel timing, as the channel being replaced, is used to drive the second modulator 709 of inline phase modulator 710 to establish the proper phase for the replaced channel in the TDM signal outputted on line 711. It should be noted that the circuits of FIG. 7 can be arranged to delete one or more selected data bits in a variety of time slots (or channels) of the received TDM signal 700. By reusing time-slots it is possible to maximize the capacity of the overall system.

Shown in FIG. 8 is another embodiment of a network node having a overwrite/replace channel capability. The circuit of FIG. 8 is the same as that of FIG. 7 except that instead of first clearing and then replacing a data channel as in FIG.7, the data channel is overwritten directly in FIG. 8. In FIG. 8 only a single electrode 802 is needed in phase modulator 801. The circuits 701, 703, 706 and 707 operate as previously described. The outputs from channel reset 707 and flip-flop 706 are connected to an exclusive-OR circuit 803. The output from exclusive-OR circuit 803 is a new data channel signal having the proper channel timing. The new data channel signal is applied to the single electrode 802 of phase modulator 801 to overwrite the selected channel to be replaced.

What has been described is merely illustrative of the application of the principles of the present invention. Other arrangements and methods can be implemented by those skilled in the art without departing from the spirit and scope of the present invention.

What is claimed is:

1. A Differential Phase Shift Keying (DPSK) transmitter comprising
   a laser for generating an optical carrier signal,
   a delay encoder for providing a different delay for each of a plurality, M, of input signal channels, and
   a M channel phase modulator for phase modulating the optical carrier signal with each of the differently delayed M input signal channels to form a Time Division Multiplexed (TDM) phase modulated optical signal.

2. The DPSK transmitter of claim 1 wherein the data bit rate of the input signal channels are the same.

3. The DPSK transmitter of claim 1 wherein the highest data bit rate channel of any of the M input signal channels has a bit time, $\tau_0$, and wherein each of the different delays provided by the delay encoder is equal to at least $m \cdot \tau$, where $\tau = \tau_0/X$ and m is an integer $0 \leq m \leq X-1$, and where X is an integer $\geq M$.

4. The DPSK transmitter of claim 3 wherein the data bit rate of at least one of the input signals has a bit time equal to $\tau_d$, where $\tau_d = p \cdot X \cdot \tau$, where p is an integer $\geq 2$.

5. A router circuit comprising the DPSK transmitter of claim 1 wherein the delay encoder includes
   means for controlling the value of the different delays for each of the M input signal channels,
   said router further comprising
   a receiver for demodulating a TDM phase modulated optical signal received from the DPSK transmitter, the receiver including
      a first and a second signal paths for receiving a portion of the received TDM phase modulated optical signal, the second signal path having a delay which exceeds a delay of the first signal path by $\tau$, where $\tau = \tau_0/X$, where $\tau_0$ is the bit period of the highest data bit rate channel of the M input signal channels, and where X is an integer $\geq M$, and
      a square-law detector for demodulating a signal formed from the combined signals outputted from the first and second paths; and
   a demultiplexer for receiving a demodulated signal from the square-law detector and demultiplexing it into M received signal channels.

6. A Differential Phase Shift Keying (DPSK) system comprising
   a transmitter including
   a laser for generating an optical carrier signal,
   a delay encoder for providing a different delay for each of a plurality, M, of input signal channels, and
   a M channel phase modulator for phase modulating the optical carrier signal with each of the differently delayed M input signal channels to form a Time Division Multiplexed (TDM) phase modulated optical signal for transmission over an optical facility and
   a receiver for demodulating a TDM phase modulated optical signal received from over the optical facility, the receiver including
      a first and a second signal paths for receiving a portion of the received TDM phase modulated optical signal, the second signal path having a delay which exceeds a delay of the first signal path by $\tau$, where $\tau = \tau_0/X$, where $\tau_0$ is the bit period of the highest data bit rate channel of the M input signal channels, and where X is an integer $\geq M$, and
      a square-law detector for demodulating a signal formed from the combined signals outputted from the first and second paths.

7. The DPSK system of claim 6 wherein the data bit rate of the input signal channels are the same.

8. The DPSK system of claim 6 wherein the highest data bit rate channel of any of the M input signal channels has a bit time, $\tau_0$, and wherein each of the different delays provided by the delay encoder is equal to at least $m \cdot \tau$, where $\tau = \tau_0/X$ and m is an integer $0 \leq m \leq X-1$, and where X is an integer $\geq M$.

9. The DPSK system of claim 8 wherein the data bit rate of at least one of the input signals has a bit time equal to $\tau_d$, where $\tau_d = p \cdot X \cdot \tau$, where p is an integer $\geq 2$.

10. An add node for adding an add signal channel to an empty time slot channel of a received Time Division Multiplexed (TDM) phase modulated optical signal, said add node comprising
    a receiver for demodulating the received TDM signal, the receiver including
       a first and a second signal paths for receiving a portion of the received TDM signal, the second signal path having a delay which exceeds a delay of the first signal path by $\tau$, where $\tau = \tau_0/X$, where $\tau_0$ is the bit period of the highest data bit rate channel of the M input signal channels, and where X is an integer $\geq M$, and
       a square-law detector for demodulating a signal formed from the combined signals outputted from the first and second paths to form an output signal including the empty time slot channel;
    a clock recovery circuit responsive to the output signal for producing a clock signal having the same bit timing as the empty time slot channel;
    a first circuit responsive to the clock signal and the new channel signal for producing a clocked new channel signal; and
    a channel phase modulator for phase modulating the clocked new channel signal into the empty time slot channel of the received TDM phase modulated optical signal.

11. A channel replace node for replacing a selected channel of a received Time Division Multiplexed (TDM) phase modulated optical signal with a new channel signal, said channel replace node comprising
    a receiver for demodulating the received TDM phase modulated optical signal, the receiver including
       a first and a second signal paths for receiving a portion of the received TDM phase modulated optical signal, the second signal path having a delay which exceeds a delay of the first signal path by $\tau$, where $\tau = \tau_0/X$, where $\tau_0$ is the bit period of the highest data bit rate channel of the M input signal channels, and where X is an integer $\geq M$, and
       a square-law detector for demodulating a signal formed from the combined signals outputted from the first and second paths to form an output signal;
    a clock recovery and demultiplexer circuit channel select circuit responsive to the output signal and a channel select signal for producing a clock signal having the same bit timing as the selected channel of the received TDM signal and a demultiplexed data channel signal;
    a first circuit responsive to the clock signal and the new channel signal for producing a clocked new channel signal; and
    a second circuit, including a channel phase modulator, responsive to the clocked new channel signal and the demultiplexed data channel signal for overwriting the selected channel of the received TDM signal with data represented by the clocked new channel signal.

12. The channel overwrite node of claim 11 wherein the channel phase modulator includes
    a first electrode for receiving the demultiplexed data channel signal and for phase modulating the received TDM signal channel using the demultiplexed data channel signal so as to clear data from the selected channel of the received TDM signal;
    a second electrode for receiving the clocked new channel signal and for phase modulating the cleared selected channel of the received TDM phase modulated optical signal using the clocked new channel signal so as to write data of the new data channel signal onto the cleared selected channel.

13. The channel replace node of claim 11 wherein the second circuit includes
    a channel reset circuit responsive to the demultiplexed data channel signal for generating a reset channel signal;

an exclusive-OR circuit for performing an exclusive-OR combining of the reset channel signal and the clocked new channel signal to form an exclusive-OR signal, and a single electrode for receiving the exclusive-OR signal and for phase modulating the selected channel, of the received TDM signal, so as to overwrite data on the selected channel with the new data channel signal.

14. A method of operating a Differential Phase Shift Keying (DPSK) transmitter comprising the steps of:

receiving an optical carrier signal, providing a different delay for each of a plurality, M, of received input signal channels, and phase modulating the optical carrier signal with each of the differently delayed M input signal channels to form a Time Division Multiplexed (TDM) phase modulated optical signal.

15. A method of operating a router circuit comprising the steps of:

receiving an optical carrier signal, providing a different delay for each of a plurality, M, of received input signal channels, and phase modulating the optical carrier signal with each of the differently delayed M input signal channels to form a Time Division Multiplexed (TDM) phase modulated optical signal controlling the value of the different delays for each of the M input signal channels, demodulating the TDM phase modulated optical signal received from the DPSK transmitter by receiving a first signal portion of the TDM phase modulated optical signal;

receiving a second signal portion of the received TDM phase modulated optical signal;

delaying the second signal portion relative to the first signal portion by a delay $\tau$, where $\tau=\tau_0/X$, where $\tau_0$ is the bit period of the highest data bit rate channel of the M input signal channels, and where X is an integer $\geq M$;

square-law demodulating a combined signal, formed from the first and the delayed second signal portion, to form a demodulated signal including an empty time slot channel; and receiving the demodulated signal and demultiplexing it into M received signal channels.

16. A method of operating an add node for adding a new signal channel to an empty time slot channel of a received Time Division Multiplexed (TDM) phase modulated optical signal, comprising the steps of:

receiving a first signal portion of the received TDM phase modulated optical signal;

receiving a second signal portion of the received TDM phase modulated optical signal;

delaying the second signal portion relative to the first signal portion by a delay $\tau$, where $\tau=\tau_0/X$, where $\tau_0$ is the bit period of the highest data bit rate channel of the M input signal channels, and where X is an integer $\geq M$;

square-law demodulating a combined signal, formed from the first and the delayed second signal portion, to form an output signal including an empty time slot channel;

forming a product signal from the new signal channel multiplied with the output signal; and using the product signal, phase modulating the selected channel of the received TDM phase modulated optical signal so as to overwrite the data in the selected channel with data from the new signal channel.

17. A method of operating a channel replace node for replacing a selected channel of a received Time Division Multiplexed (TDM) phase modulated optical signal with a new channel signal, comprising the steps of:

receiving a first signal portion of the received TDM phase modulated optical signal;

receiving a second signal portion of the received TDM phase modulated optical signal;

delaying the second signal portion relative to the first signal portion by a delay $\tau$, where $\tau=\tau_0/X$, where $\tau_0$ is the bit period of the highest data bit rate channel of the M input signal channels, and where X is an integer $\geq M$;

square-law demodulating a combined signal, formed from the first and the delayed second signal portion, to form an output signal including an empty time slot channel;

producing, in response to the output signal and a channel select signal, a clock signal having the same bit timing as the selected channel of a received TDM signal and a demultiplexed data channel signal;

producing, in response to the new channel signal, a clocked new channel signal; and overwriting, in response to the clocked new channel signal and the demultiplexed data channel signal, the selected channel of the received TDM signal with data represented by the clocked new channel signal.

* * * * *